United States Patent [19]

Smadar et al.

[11] 3,814,560

[45] June 4, 1974

[54] APPARATUS FOR EXTRUDING TOROIDS OF SETTABLE SLURRIES WITH MEANS TO WASH THE EXTRUDATE DURING FORMATION AND SEVERANCE

[75] Inventors: Yechiel Smadar, New York; Howard Roth, Bronx; John P. McCarthy, College Point; John Moyer, Garden City, all of N.Y.

[73] Assignee: DCA Food Industries, Inc., New York, N.Y.

[22] Filed: Dec. 10, 1971

[21] Appl. No.: 206,962

Related U.S. Application Data

[62] Division of Ser. No. 839,173, July 7, 1969, Pat. No. 3,650,765.

[52] U.S. Cl.............. 425/104, 425/96, 425/227, 425/288, 425/404, 99/516, 99/103
[51] Int. Cl............................................. A21c 11/16
[58] Field of Search............ 425/404, 287, 288, 91, 425/93, 94, 96, 104, 225, 227, 72; 99/516, 534, 100, 131, 168; 118/24

[56] References Cited
UNITED STATES PATENTS

| | | | |
|---|---|---|---|
| 2,184,825 | 12/1939 | Wackler | 425/288 |
| 2,403,547 | 7/1946 | Peschardt | 99/131 |
| 2,531,986 | 11/1950 | Pile et al. | 425/404 |
| 2,813,030 | 11/1957 | Rivoche | 99/103 X |
| 2,953,106 | 9/1960 | Jacobs | 425/96 |
| 2,992,925 | 7/1961 | Green et al. | 99/131 |
| 3,502,757 | 3/1970 | Spencer | 425/227 X |
| 3,650,766 | 3/1972 | Smadar | 99/168 |

Primary Examiner—J. Spencer Overholser
Assistant Examiner—David S. Safran
Attorney, Agent, or Firm—Amster & Rothstein

[57] ABSTRACT

A method and apparatus for preparing food products wherein an extrudable slurry of the food product and a gel forming material which is settable upon exposure to a setting solution and is capable of forming a skin, is extruded into an elemental shape, such as a torroid, while washing the surfaces of the elemental shape with the setting solution to form a skin onto the shape. Extrusion is continued to expand the elemental shape into a final extruded food product, with the skin serving to envelope and contain the initial slurry during further extrusion and until such time as the product is completed, as by further processing which may include coating and finally stabilizing the slurry as by cooking, baking, frying, freezing or the like.

1 Claim, 11 Drawing Figures

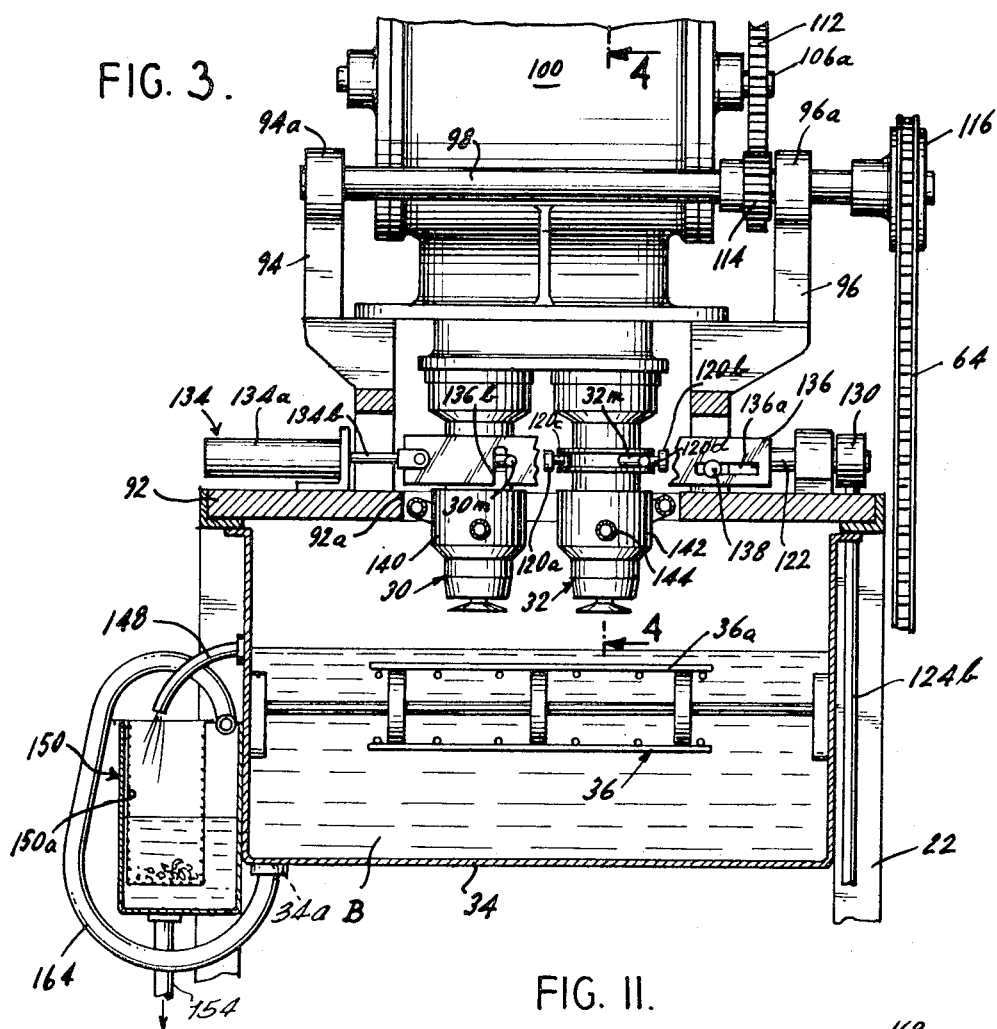
FIG. 3.
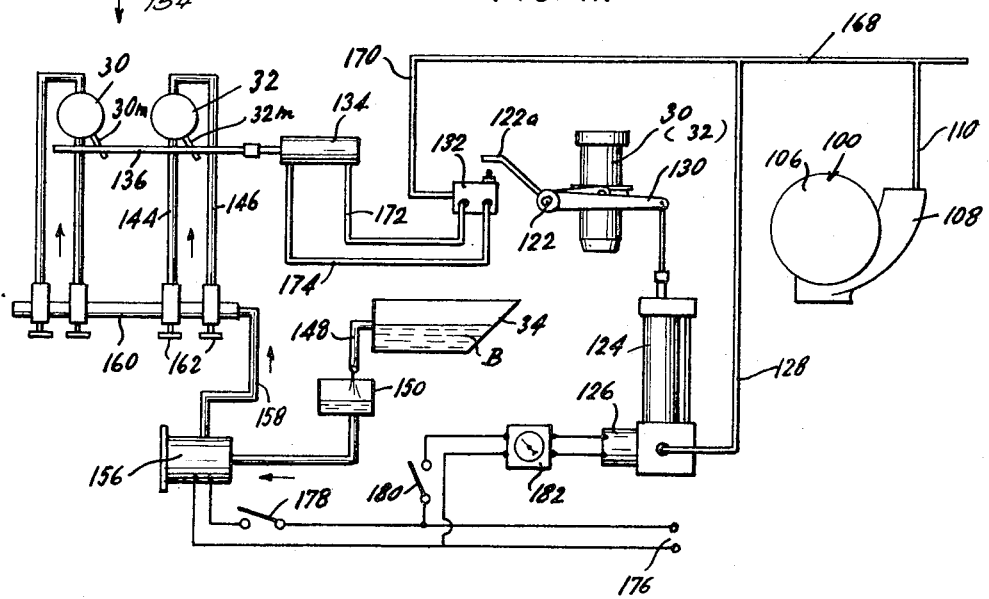
FIG. II.

ONION RING

EXTRUDED FOOD CORE
GELLED ENVELOPE

APPARATUS FOR EXTRUDING TOROIDS OF SETTABLE SLURRIES WITH MEANS TO WASH THE EXTRUDATE DURING FORMATION AND SEVERANCE

This is a division of application Ser. No. 839,173 filed July 7, 1969, now U.S. Pat. No. 3,650,765.

The present invention relates generally to an improved method and apparatus for preparing food products, and in particular to a process for preparing a shaped and extruded food product and apparatus for the practice of such process which is suitable for mass production of a wide variety of food products, including without limitation, onion and other vegetable rings, fish, fowl and meat extrusions, encapsulated dairy and dessert products, and the like.

It has been suggested in the prior art that a wide variety of extruded comminuted foods could be prepared, including those of vegetables, meats, starch, fish, fruits or the like, by imparting an elemental structure or shape to the comminuted food through the use of a structure-forming matrix, such as an algin which hardens or sets upon exposure to a gelation agent. Once sufficient structure is imparted to the comminuted food by the gelled algin, the particulate food product is then finished by cooking, baking, frying or freezing, as is appropriate for the particular comminuted food being processed. However, gelation of a structure-forming matrix dispersed throughout the comminuted food product is undesirable both from the standpoint of processing and the ultimate eating characteristics of the processed food except, of course, when the final food product is in the nature of a gel, (i.e., a gelled dessert.) There exists a need for an improved process and apparatus which will enable the extrusion of shaped food products, starting with a fluid slurry containing the particulated food wherein sufficient structure is imparted to the elemental extruded shape to enable the processing thereof to a point wherein the fluid slurry is stabilized, as by cooking, baking, frying or freezing, without affecting the eating characteristics.

In copending application Ser. No. 839,191, now U.S. Pat. No. 3,650,766 in the name of Yechiel Smadar filed on July 7, 1969 and entitled "Extruded Food Product and Method," which is assigned to the assignee of the present application, there is disclosed as a new product of manufacture, an extruded food product which includes a flowable core of comminuted food admixed with a gel-forming material which is settable upon exposure to a setting solution. The flowable core is contained within a skin or envelope by the gel-forming material formed on the surface of the core which serves to confine the core for further processing and until such time as the core is stabilized by appropriate processing. In one embodiment, the method of the copending application involves the steps of forming an extrudable slurry of the food product containing at least a settable gel-forming material, followed by the extrusion of the slurry into a shape and the formation on the surface of the shape of a growing skin or envelope which imparts stability to the flowable slurry. Numerous food products can be manufactured in accordance with this technique including, for example, extruded onion rings which may be baked or French fried and which are of uniform structure and include a core of chopped onions (or an onion substitute) contained within a battered and breaded coating. Such onion rings may be sold either in finished frozen state ready to be eaten upon heating or in partially completed frozen state ready for final processing, as by baking or frying. Apart from the elimination of the time consuming and expensive processing of whole onion slices, with variations in the final product due to differences from onion to onion, the final product has an excellent appearance and enhanced eating properties which may be modified and improved upon by the addition of flavoring agents, color agents and other property imparting ingredients.

Broadly, it is an object of the present invention to provide an improved apparatus and process for preparing extruded and shaped food products of the aforesaid type. Specifically, it is within the contemplation of the present invention to provide an improved process and method for the extrusion of food products from a flowable extrudable slurry containing one or more food ingredients which process and apparatus is suitable for mass production manufacture at relatively low unit cost, produces a highly uniform product with little or no shrinkage and is virtually automatic in operation, requiring minimal operator attendance and service.

In accordance with method aspects of the invention, a shaped and extruded food product is prepared by forming an extrudable slurry containing food particles and a gel-forming fill. The slurry is extruded into an elemental shape, which in many instances will be torroidal, while exposing only the surfaces thereof to a wash containing a setting or gelation agent for the gel-forming material. The wash forms an outer gel-like skin on the shape which continuously grows during continued extrusion and retains the elemental shape as the extruded product increases in volume. Upon completion of extrusion, the final shaped and extruded food product is immersed in a bath containing the gelation agent to build up the outer skin and to insure that the skin completely envelopes the extrudable fluid slurry. The fully enveloped extrusion product may then be further processed such as by applying an edible coating to the enveloped extrusion. For example, in the manufacture of onion rings, the bath wash and bath employed during processing is a batter containing a gelation agent such that skin formation is accompanied by battering of the exterior surfaces of the shaped and extruded food product. The edible coating may be any suitable breading. The process may be terminated at this point, with the partially prepared food product in a condition to be sold for final processing at any appropriate level including institutions, restaurants or homes. Alternatively, the food processing can continue to either partially or completely stabilize the slurry, as by cooking, baking, frying or the like.

In accordance with apparatus aspects of the present invention, there is provided an extrusion head which includes a cutter disc and cutter sleeve which cooperate to define an extrusion nozzle. The cutter disc and cutter sleeve are movable relative to each other to cut off successive extrusions from an extrudable and settable slurry including the desired food product. Provision is made for periodically charging the extrusion head with the slurry for the formation of successive extrusions at the nozzle. The extrusion head is washed at the nozzle with a solution capable of setting the slurry to form a skin on the extrusion; and as the extrusion grows in volume, the skin is continuously formed by contact with the wash and confines the slurry until the extrusion is completed. Cutter actuating means are operable in timed relation to the charging means for moving the cutter disc and cutter sleeve relative to each other to cut off successive expanded extrusions. In typical processing apparatus, the extrusions then fall into a further processing bath containing the setting solution which continues to act upon the exposed surfaces of the final extrusions to completely envelope and contain the same. The apparatus can be constructed to incorporate conveyer systems for further processing which may be, for example, the breading of both sides of onion rings or may be used in conjunction with commercially available coating units to complete the processing of the final extruded shapes.

The above brief description, as well as further objects, features and advantages of the present invention will be more fully understood by reference to the following detailed description of a presently preferred but nonetheless illustrative embodiment in accordance with the present invention, when taken in conjunction with the accompanying drawings, wherein:

FIG. 3 is a sectional view, taken substantially along the line 3—3 of FIG. 1 and showing details of the in-tandem extrusion heads and related mechanisms of the machine;

FIG. 11 is a schematic and diagrammatic view of a typical control for the present machine.

Figure 1:
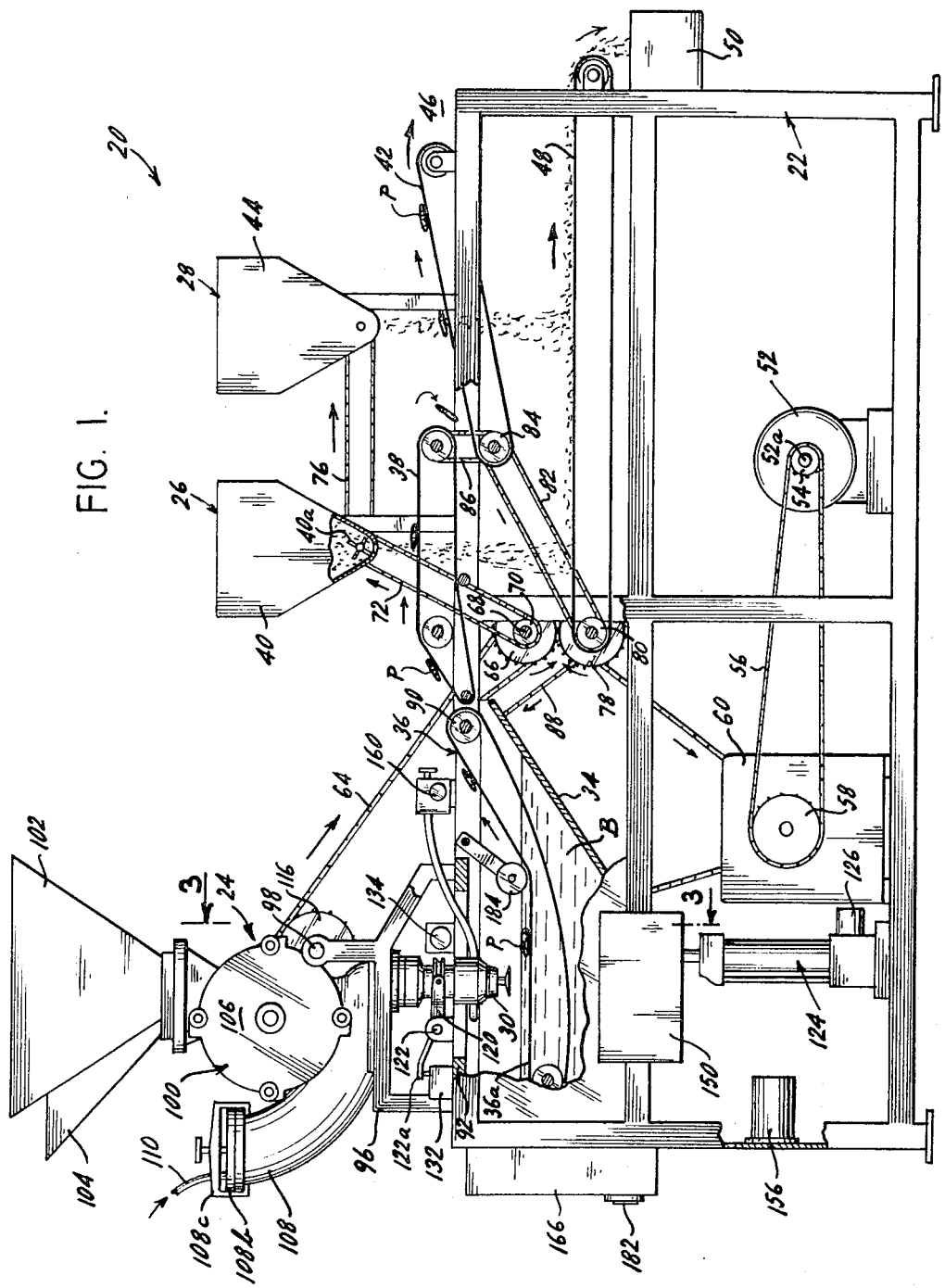
FIG. 1 is a side elevational view of a food extruding and processing machine demonstrating features of the present invention useful in the manufacture of onion rings.

Referring now specifically to the drawings, and in particular to FIG. 1, there is shown a typical machine 20 for preparing a shaped and extruded food product in accordance with the present invention which includes a main frame 22, an extrusion station 24, a first breading station 26 and a second breading station 28. Although it is advantageous to have the illustrated single and integrated unit, as the description proceeds it will become evident that the mechanisms at the extrusion station 24 find useful application in conjunction with conventional and commercially available breading and coating units. Additionally, although the apparatus will be described in conjunction with its intended use for the manufacture of onion rings, it will also be appreciated that the present equipment is useful for handling a wide range of extrudable food products which are temporarily stabilized during and after extrusion and until such time as the food product is stabilized by cooking, freezing or the like.

Figure 9:
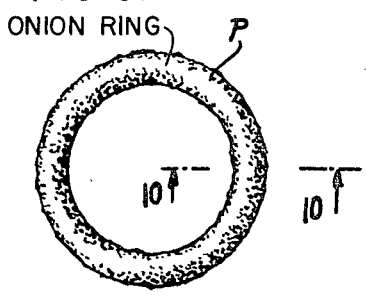
FIG. 9 is a plan view of a typical, completely shaped, extruded and enveloped food product having an extrudable slurry core and encapsulating skin made in accordance with the present apparatus and process.
Figure 10:
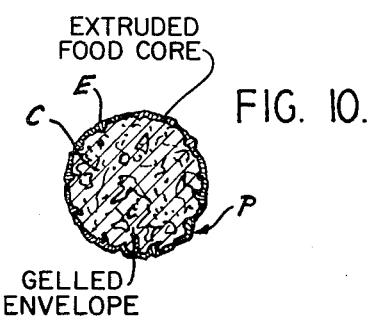
FIG. 10 is a sectional view taken substantially along the line 10—10 of FIG. 9 and on an enlarged scale.

In the overall, the machine 20 includes a pair of extrusion heads 30, 32 at the extrusion station 24 which form the desired product P (shown in FIGS. 9 and 10), with the heads 30, 32 being disposed side by side above a processing tank 34 containing bath B. Extending into the processing tank 34, is tank conveyor 36 which, in this illustrative embodiment, moves the extruded and enveloped food product P onto a first breading station conveyor 38 which carries the food product P below the first breading hopper 40 for breading on one side thereof. The first breading conveyor 38 is arranged to flip-over and deliver the breaded food product onto a second breading conveyor 42 which passes beneath the second breading hopper 44 which serves to bread the second side of the food product. The final product is discharged at location 46 into an appropriate receptacle or onto a further conveyor. For example, in the manufacture of onion rings, a conveyor may be arranged at location 46 to carry the partially completed product to a freezing or frying unit, depending upon the desired state of finish for the product. Extending beneath both the first and second breading conveyors 38, 42 is a pickup conveyor 48 which receives the spillover of breading from conveyors 38, 42 and delivers the same to a collection bin or receptacle 50.

Figure 2:
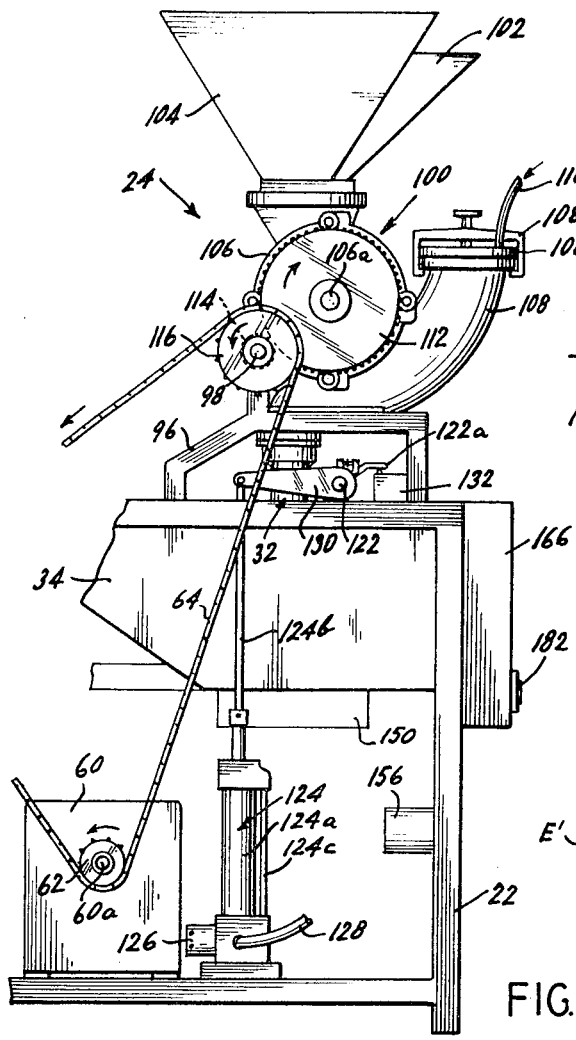
FIG. 2 is a partial rear elevational view of the machine shown in FIG. 1.

The overall machine drive includes a main drive motor 52 mounted on main frame 22 which has its output shaft 52a connected via output sprocket 54 and chain 56 to the input sprocket 58 of reduction gear box 60. Reduction gear box 60 has an output sprocket 62 on its output shaft 60a (see FIG. 2) which imparts drive to main drive chain 64 which imparts drive to the several conveyors 36, 38, 42 and 48 and to the slurry feeder at the extrusion station 24. Main drive chain 64 is coupled to a main drive gear 66 mounted on main shaft 68. Main shaft 68 also carries an output pulley or sprocket 70 which via chain 72 operates spreader 40a at the first breading station 26. An appropriate power takeoff is derived from the shaft of spreader 40a via chain 76 to actuate the spreader at the second breading station 28. From drive gear 66, power takeoff is derived via driven gear 78 for the breading collector conveyor 48 and via sprocket 80, chain 82 and sprocket 84 drive is imparted to the second breading conveyor 42. Additionally, from sprocket 84 via chain 86 drive is imparted to the first breading conveyor 38. Finally, via chain 88 drive is imparted to sprocket 90 of the tank conveyor 36. It is to be emphasized that a latitude of modification, change and substitution is contemplated in the arrangement of the breading stations 26, 28 and their related conveyors and drives; and the stations, their conveyors and drive may be eliminated and the basic shaping and extruding mechanism at station 24 will find application with other types of breading, coating conveying and processing equipments.

Considering now FIGS. 1 through 4 inclusive, the apparatus at the extrusion station 24 is seen to include a base plate 92 extending from side to side of the machine above tank 34, with an appropriate central cutout 92a for the side by side extrusion heads 30, 32. Extending upwardly from base plate 92 are station side frames 94, 96 which have bearings 94a, 96a for transverse feeder drive shaft 98 for the extrusion feeder 100. Frames 94, 96 also support feeder 100 which is of essentially conventional construction and includes a slurry hopper 102 containing the extrudable food slurry S, a hopper vent 104, slurry-charging valve 106 and extrusion chamber 108 (see FIGS. 1 and 4). Slurry hopper 102 merely feeds the slurry S into the slurry-charging valve 106 which includes valve shaft 106a, a multi-pocketed valve body 106b and valve housing 106c. In response to clockwise rotation of valve shaft 106a, valve body 106b rotates in the clockwise direction to deliver successive charges of the slurry S from valve inlet port 106d to valve outlet port 106e whereupon the slurry S egresses into the high pressure extrusion chamber 108 which delivers successive charges at the identical extrusion heads 30, 32. Pressure chamber 108 includes a clean out port 108a which is closed by cap or cover plate 108b releasably held in position by removable clamp 108c, with the air being introduced into chamber 108 from compressed air line 110. Drive is imparted to the valve body or stem 106b via its shaft 106a which is connected by gearing 112, 114 (FIG. 3) to the feeder drive shaft 98 which in turn is connected to main drive chain 64 at drive sprocket 116 (see FIG. 3). Further description of the slurry feeder 100 will be dispensed with in that it is a commercially available and conventional unit which has heretofore been used extensively in the manufacture of donuts and like products.

Figure 5:
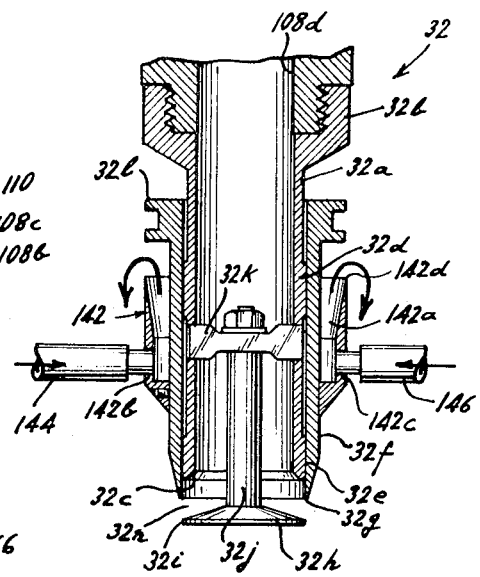
FIG. 5 is a sectional view, with parts broken away, showing one of the extrusion heads in a particular adjusted position and prior to the start of the extrusion of an elemental food shape.
Figure 6:
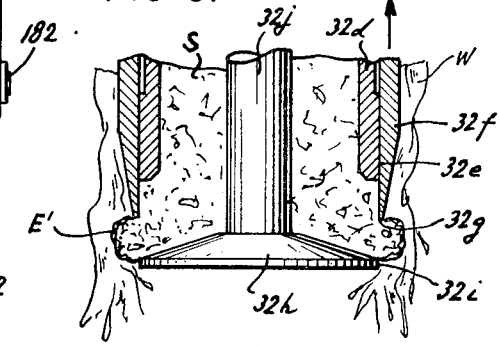
FIG. 6 is an enlarged sectional view similar to FIG. 5, but further broken away and showing the commencement of extrusion of an elemental shape at the extrusion nozzle.
Figure 7:
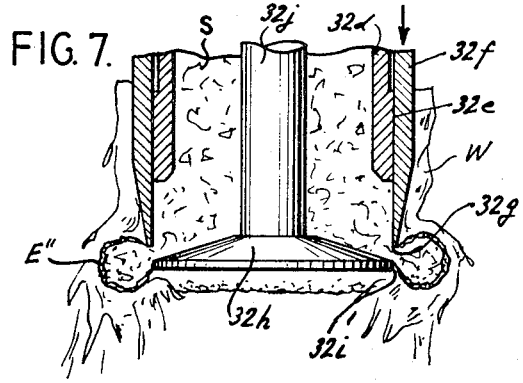
FIG. 7 is a view similar to FIG. 6, showing the extrusion progressed to a point just prior to cut off.
Figure 8:
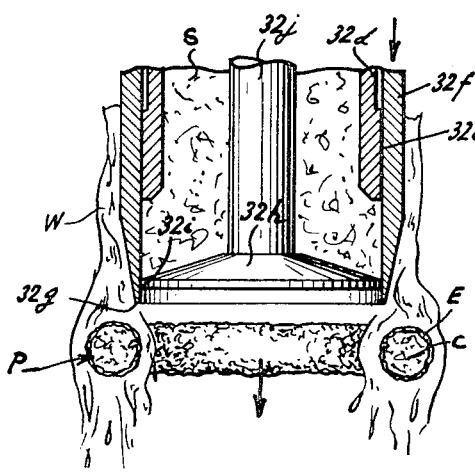
FIG. 8 is a view similar to FIG. 7, and showing the position of the cutter disc and cutter sleeve of the extrusion head after cutoff and completion of an extrusion.
Figure 4:
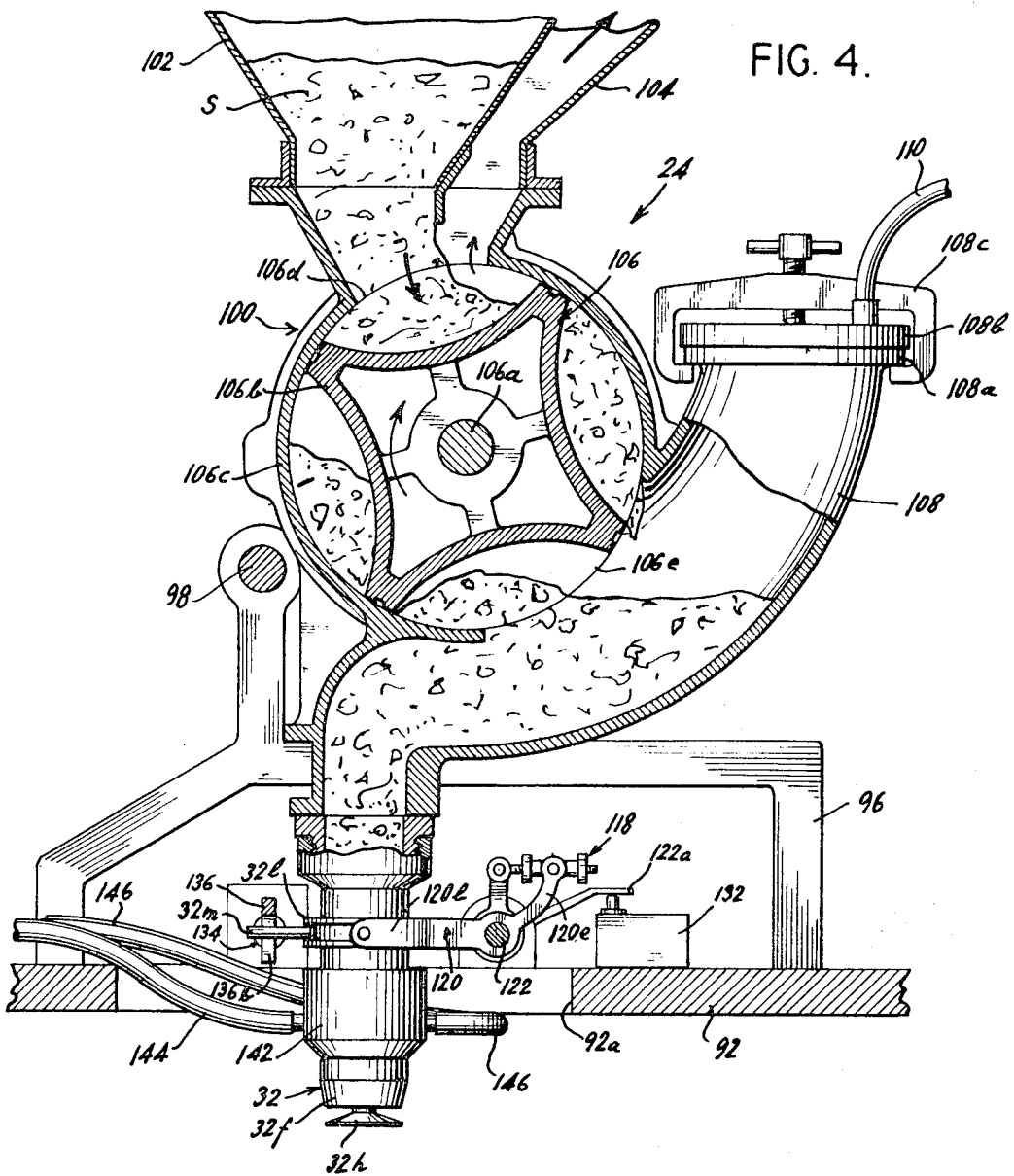
FIG. 4 is a sectional view taken substantially along the line 4—4 of FIG. 3, on an enlarged scale and showing details of the extrusion head and the charging unit and valve assembly.

The extrusion heads 30, 32 are of identical construction, the details of which are seen best in FIGS. 4 and 5. For example, extrusion head 32 includes a cylindrical cutter nozzle 32a which carries at its upper end an internally threaded attachment collar 32b which is secured to the corresponding outlet port 108d of the extrusion chamber 108 as seen in FIG. 4. At its opposite end, cutter nozzle 32a terminates in a chamfered opening 32c and on its exterior it is provided with circumferentially extending bearing surfaces 32d, 32e for a reciprocal and rotatable cutter sleeve 32f. Sleeve 32f terminates at its lower end in a cutting edge 32g which coacts with a cutter disc 32h having cutter edge 32i fixed to the cutter nozzle 32a by central rod 32j and bridge piece 32k. At its end from the cutting edge 32g, cutter sleeve 32f is formed with a drive collar 32l which is engaged by the forked arms of a driving yoke 120, to be described, which moves the cutter sleeve 32f through a cutting stroke relative to the cutter disc 32h. This cutter stroke is adjustable by conventional means, illustrated generally at 118 (see FIG. 4). Additionally, cutter sleeve 32f carries a radially projecting rotating pin 32m (see FIG. 3) which is engaged and driven, both during the cutting stroke and return, to impart a rotational movement to the cutter sleeve 32f relative to the cutter disc 32h. Thus, as may be appreciated by progressively inspecting FIGS. 6 to 8 inclusive, movable cutting edge 32g initially is in an adjusted position spaced relative to the stationary cutter edge of 32i of cutter disc 32h with which it defines an annular and radially extending nozzle 32n. The initial height of extrusion nozzle or orifice 32n is adjustable and progressively closes incident to movement of cutting edge 32g relative to the cutting edge of 32i. At the end of the extrusion, cutting edge 32g passes cutting edge 32i as seen in FIG. 8, to cutoff the comleted extrusion P. During such cutting stroke, rotational movement is imparted to the cutter sleeve 32f such that its cutting edge 32g sweeps by disc edge 32i and achieves a substantially perfect cutting action.

The initial adjustment of cutter sleeve 32f relative to cutter disc 32h determines the size parameters of the extrusion nozzle 32n and is established by the conventional mechanisms 118 (see FIG. 4) which include an adjustment yoke 120 mounted on shaft 122 and having arms 120a, 120b carrying drive pins 120c, 120d which are received with drive collar 32L (see FIG. 3). Projecting rearwardly from arms 120a, 120b, is an adjustment arm 120e which is manipulated to rock adjustment yoke 120 about shaft 122 to achieve the required initial adjustment for the extrusion head 32, it being appreciated that the same arrangement is provided for extrusion head 30.

The drive for the linear cutting stroke of the extrusion heads 30, 32 is provided from a double-acting piston and cylinder assembly 124 (see FIG. 2) which includes cylinder 124 and a piston rod 124b coupled to drive arm 130 for the respective extrusion heads 30, 32. The double acting piston and cylinder assembly 124 is controlled by a solenoid-controlled valve 126, with the air supply being over line 128, as will be described in conjunction with FIG. 11. Thus, as air is introduced to the lower end of cylinder 124a, piston 124b is driven upwardly which via arm 130 moves the cutter sleeve 32f in one direction. When air is ported from the lower end of cylinder 124a, via line 124c to the upper end of the cylinder, piston rod 124b is driven downwardly to move the cutter sleeve 32f downwardly through its cutting stroke relative to cutter disc 32h.

Coordinated reciprocation of the cutter sleeves of the extrusion heads 30, 32 is achieved via a further pneumatic mechanism which is controlled by a four-way air valve 132, is mounted on base plate 92 (see FIG. 4) in position to be operated by valve actuator 122a on shaft 122. The four-way air valve controls piston and cylinder assembly 134 which is mounted on base plate 92 outwardly of station frame side 94 (see FIG. 3). Assembly 134 includes cylinder 134a, with its piston shaft 134b connected to a slide plate 136 which is mounted on the frame of the machine, as by pins 138 receives within slot 136a. Slide plate 136 is provided with appropriate cutouts, such as 136b, to receive the corresponding pins 30m of cutter sleeve 30f (and, of course, pin 32m for cutter sleeve 32f) to achieve the appropriate coordinated rotation of the respective cutter sleeves. As the cutter sleeves reciprocate in one direction, they rotate in one direction, and as they reciprocate in the opposite direction, they rotate in the opposite direction, with valve actuator 122a signalling appropriate change in direction via four-way air valve 132.

Provision is made for circumferentially washing each of the extrusion heads 30, 32 at a location above the respective adjustable extrusion nozzles or orifices 30n, 32n with a setting or gelation agent. This agent or solution functions throughout extrusion to form an continuously growing skin on the extrusion and assists, at the completion of the extrusion, in releasing or freeing the completed extrusions from the respective heads. To this end, the extrusion heads 30, 32 carry circumferential extending, upwardly opening weirs, designated respectively by the reference numerals 140, 142, the constructional details of which are seen best in FIG. 5 in association with extrusion head 32. Weir 142 defines an annular reservoir 142a which has a number of inlet openings 142b, 142c about its lower edge and a spillover edge 142d in a location spaced above the extrusion nozzle or orifice 32n. Inlets 142b, 142c are connected via inlet pipes 144, 146 to a source of supply for the setting or gelation solution which in this instance is derived from a closed circulating system including tank 34. Specifically, tank 34 includes overflow pipe 148 which is disposed at the appropriate level in tank 34. Although overflow pipe 148 is illustrated as being in a fixed position, it can be arranged to provide adjustable levels of gelation solution in tank 34. Overflow pipe 143 circulates the setting solution or gelation agent into a filter 150 which has a removable foraminous trap 150a and a fluid outlet pipe 154 at its lower end which is connected via pump 156 (see FIGS. 1 and 11) to the respective inlet pipes 144 and 146 associated with the extrusion heads 30, 32. Conveniently, and as seen in FIG. 11, outlet pipe 158 is connected to a manifold 160 which includes individual adjustable hand valves 162 for the several weir feeding lines 144, 146. The valves 162 adjust the flow and pressure of the gelation agent or setting solution to the weirs associated with the extrusion heads. Although the illustrated and described system for washing the respective extrusion heads 30, 32 with the setting solution involve the use of an overflowing weir in a closed circulating system from tank 34 through pipe 164, it will be appreciated that other techniques may be employed for exposing the extrusion nozzles 30, 32 to the requisite washing solution for forming skins on the extrusions and for assisting in stripping the completed extrusions from the heads. For convenience in servicing, recirculating pipe 164 (see FIG. 3) connected to tank 34 at a drain port 34a may also serve as a drain pipe.

At any convenient location on the machine, for example, at the front left side, there is provided a control box or panel, generally designated by the numeral 166, which houses the several controls and a number of circuit components used in establishing coordinated machine operation. By reference to FIG. 11, which is a combined pneumatic and electrical diagram, the several control functions and their coordination will be readily understood. As seen in FIG. 11, there is provided a main air line 168 which is connected via branch line 110 to the pressure chamber 108 of the extrusion feeding and charging unit 100. Main air line 168 is also connected via branch line 128 to the piston and cylinder assembly 124 for driving the cutter sleeves of the extrusion heads 30, 32. Additionally, main line 168 is connected by a branch line 170 to the air inlet of the four-way control valve 132 associated with pneumatic drive 134 for slide member 136. This rotates the respective cutter sleeves of the extrusion heads 30, 32 in the requisite timed relation, four-way valve 132 having two outlet lines 172, 174 connected to the opposite ends of the double-acting cylinder 134a of pneumatic drive 134.

The electrical system includes an appropriate AC source 176 which is connected over switch 178 to pump 156 and over switch 180 to pulse timer 182 which may be arranged to deliver periodic actuating pulses to the solenoid-controlled valve 126 for the pneumatic drive 124 for the extrusion heads 30, 32. Pulse timer 182 may be set to provide an output anywhere in the range of from 1 to 6 seconds; and upon providing such output, valve 126 will appropriately port the pneumatic drive 124 for driving the respective cutter sleeves through their cutting strokes.

Progressive reference will now be made to FIGS. 5 to 8 inclusive for description of the extrusion sequence which in this illustrative embodiment results in a torroidal shape (see FIGS. 8 to 10) which includes a fluid core C of the food slurry S cased within a skin E which maintains the shape and confines the slurry S for additional processing including coating, stabilizing, etc. At the start of the extrusion sequence, the slurry S is injected through nozzle or orifice 32n (see FIG. 6) and is immediately exposed to the gelation wash W which is capable of setting or gelling the gel-forming material (i.e., sodium alginate) contained within the slurry S. As the elemental extrusion is formed (FIG. 6), the setting solution which contains alkaline earth-metal ions (e.g., calcium ions) immediately forms a skin E' which extends from the moving cutting edge 32g of cutter sleeve 32f to the stationary disc edge 32i. As extrusion continues (see FIG. 7) the elemental envelope or skin E'' continues to grow and contain the build up of the torroidal extrusion of the slurry. Finally (see FIG. 8), after cutter edge 32g progresses beyond disc end 32h, the product P is cut off with the envelope E being completed, at least to the point where it is capable of retaining the shape of the extrusion. The combination of gravity, the washing action at the extrusion head, the rate of descent of cutter sleeve 32f and the rotation of the cutter sleeve result in the stripping of the extrusion from the nozzle and the extruded shape falls into the bath B contained in tank 34. At this point, the extrusions which are formed simultaneously by the heads 30, 32, fall onto conveyor 36 and after a brief residence time in bath B, pass out for further processing, i.e., progressive exposure to the two breading stations 26, 28. The distance of free fall of the extruded product, as well as the level of liquid through which the extruded product will fall, can be controlled by adjusting the height of conveyor 36 within tank 34. As seen in FIG. 1, conveyor 36 is provided with a medial holddown roller 184 which keeps a top run 36a of the tank conveyor 34 beneath the surface of the bath B to provide the requisite exposure of the extrusions to the setting action of the bath. If desired, holddown roller 184 may be adjusted to provide top run 36a of the conveyor with a sloping surface.

A typical sequence of operation will now be described for the manufacture of onion rings with the present equipment;

For the manufacture of onion rings, slurry S may include either diced onions or a synthetic system of the type more fully described in the above-identified copending application. For example, in a typical diced onion system, there will be provided approximately 80 percent diced fresh onions, 11 percent flour, 2.3 percent salt, 4.4 percent sugar and 2.3 percent of a 10 percent solution of the gel-forming material such as algin or sodium alginate or indeed almost any edible water soluble colloid capable of setting as a gel after treatment with a gelation agent. The bath B, which also provides the wash W for the extrusion nozzles 30, 32 may be any convenient and conventional batter containing alkaline earth metal ions, such as calcium ions. In a typical system, the batter will be composed of 1 pound of batter mix on 690 grams of water and containing approximately 12 grams of calcium chloride.

The machine is placed into operation by introducing air into main line 168 and closing switches 178, 180 after making appropriate adjustments in the size of the extrusion nozzles. As extrusion proceeds, successive forms of elemental onion rings are dropped onto the conveyor 36 and fed to conveyor 38 whereupon they are breaded on one side and then to conveyor 42 whereupon they are breaded on the other side. Due to the virtually instantaneous formation of the skin by exposure to the wash W during extrusion, followed by its buildup and completion (if required) in bath B, the extrusion can go forward at a rapid rate and the extruded product may have a relatively short residence time in bath B, of the order of 1 to 5 seconds. The skin-coated product as it comes off of the extruded head does not lose its shape incident to the free fall into the bath and, of course, retains its shape and the fluid contents of the slurry during exposure to the successive breading operations. Completion of the onion ring product involves stabilizing the slurry, as by baking or deep-fat frying, whereupon the slurry encased within the gelled skin provides a cooked flour core having fresh onion particles dispersed throughout.

For further products, formulations and uses of the present equipment and process, reference is made to said co-pending application which is incorporated herein by reference in its entirety. A latitude of modification, change and substitution is intended in the foregoing disclosure. Accordingly, it is appropriate that the appended claims be construed broadly and in the manner consistent with the spirit and scope of the present invention.

What is claimed is:

1. Apparatus for preparing a shaped and extruded food product from an extrudable and settable slurry comprising a tank adapted to contain a batter bath including a gelation agent, a vertically extending extrusion head disposed above said tank and including a cutter disc and a cutter sleeve cooperating to define an extrusion nozzle, means mounting said cutter disc and cutter sleeve for longitudinal movement relative to each other to cut off successive extrusions formed at said extrusion nozzle, means for periodically charging said head with said slurry for the formation of successive extrusions at said nozzle, washing means including a weir surrounding said cutter sleeve at a location above said extrusion nozzle for washing the surface of each successive extrusion while it is being formed at said nozzle with a solution capable of setting said slurry to form a skin on the surface of said extrusion which confines said slurry during its further formation into shaped food product and cutter actuating means operable in timed relation to the charging means for moving said cutter disc and cutter sleeve relative to each other through a cutting stroke to cut off successive food products.

* * * * *